United States Patent
Merritt

Patent Number: 6,003,487
Date of Patent: Dec. 21, 1999

[54] INTERNAL COMBUSTION ENGINE

[76] Inventor: Dan Merritt, 139 Baginton Road, Coventry, United Kingdom, CV3 6FY

[21] Appl. No.: 09/000,452
[22] PCT Filed: May 8, 1996
[86] PCT No.: PCT/GB96/01876
§ 371 Date: Apr. 20, 1998
§ 102(e) Date: Apr. 20, 1998
[87] PCT Pub. No.: WO97/06360
PCT Pub. Date: Feb. 20, 1997

[30] Foreign Application Priority Data

Aug. 5, 1995 [GB] United Kingdom .................... 9516104
Aug. 17, 1995 [GB] United Kingdom .................... 9516828
Sep. 27, 1995 [GB] United Kingdom .................... 9519675

[51] Int. Cl.⁶ ............................. F02B 75/02; F02B 19/06
[52] U.S. Cl. ......................... 123/255; 123/262; 123/269; 123/276; 123/64
[58] Field of Search .............................. 123/51 A, 51 AA, 123/51 BA, 51 B, 51 BC, 255, 258, 253, 260, 261, 262, 263, 276, 275, 290, 64

[56] References Cited

U.S. PATENT DOCUMENTS

| 2,937,630 | 9/1960 | Norton | 123/55 AA |
| 4,104,995 | 8/1978 | Steinbock | 123/51 AA |
| 4,898,126 | 2/1990 | Merritt | 123/53 A |
| 5,560,326 | 10/1996 | Merritt | 123/55 AA |

FOREIGN PATENT DOCUMENTS

| C518451 | 1/1931 | Germany . |
| 2261028 | 5/1993 | United Kingdom . |
| 2279407 | 1/1995 | United Kingdom . |
| WOA8000095 | 1/1980 | WIPO . |

Primary Examiner—Tony M. Argenbright
Assistant Examiner—Arnold Castro
Attorney, Agent, or Firm—Jeffer, Mangels, Butler & Marmaro LLP

[57] ABSTRACT

An internal combustion engine comprises one or more pairs of first and second cylinders, the first cylinder having a larger swept volume than the second cylinder and respective first and second pistons reciprocable in the cylinders. The second piston has a drive stem and divides the second cylinder into a first volume containing the drive stem of the second piston and a second volume between the two pistons. An air inlet and an exhaust outlet are provided for the first cylinder. A common combustion space is formed between the pistons when the pistons are substantially at their inner dead center positions, the combustion space comprising the second volume. A transfer means enables gas flow between the first volume and the combustion space whilst an inhibiting means inhibits the movement of a substantial amount of fuel/air mixture from the first volume into the second volume until toward the end of the compression stroke of the second piston. A fuel injector provides fuel to the first volume during the induction stroke of the second piston.

16 Claims, 6 Drawing Sheets

INTERNAL COMBUSTION ENGINE

FIELD OF THE INVENTION

The present invention relates to an internal combustion engine.

A "segregating engine" is an engine where the fuel does not begin to mix with the bulk of the air inducted by the engine until near the end of the compression stroke, just before ignition, and various internal combustion engines which can be classified as segregating engines are known, for example from GB-A-2155546, GB-A-2186913, GB-A-2218153, GB-A-2238830, GB-A-2246394, GB-A-2261028, GB-A-2268544 and GB-A-2279407. Those engines are now known in the literature as the Merritt engines.

The diesel engine is also a segregating engine whereas the spark ignition gasoline engine (SIGE) compresses a premixed mixture of fuel and air.

An important characteristic of segregating engines such as the diesel and Merritt engines is the confinement of most of the fuel, away from most of the air, until just before the moment of ignition, and the rapid delivery of the fuel into the combustion chamber near the end of the compression stroke.

The Merritt engines use what is referred to as the Merritt combustion management system (MCC) which represents a sequence of processes designed to promote combustion in a reciprocating combustion engine. In this respect it is similar to the other generic combustion management systems, such as diesel and Otto, or SIGE. MCC can be operated by a number of devices which are described in the earlier patent specifications mentioned above. MCC is characterised by the segregation of at least part of the fuel supplied to the engine in a second, smaller cylinder containing some air having a smaller piston, and the introduction of the fuel into the smaller cylinder during the exhaust and/or induction and/or compression strokes of the larger piston. The fuel remains segregated from the bulk of the air until ingression occurs, near the end of the compression strokes of both pistons. This arrangement allows the fuel appreciable time to vaporise in some air (which may include products of combustion of the previous cycle) before combustion starts, in contrast with the diesel segregating engine where liquid fuel is first injected into air just before the moment of ignition. In the MCC system the smaller cylinder is used as a vaporising cylinder and the smaller piston is used as a fuel transfer piston. Hence the smaller cylinder can be referred to as the fuel management cylinder. The larger cylinder receives the air, unthrottled and without fuel, and the larger piston is used to compress the air.

The present invention seeks to provide an improved internal combustion engine.

Accordingly, the present invention provides an internal combustion engine comprising:

at least one pair of first and second cylinders said first cylinder having a larger swept volume than said second cylinder;

respective first and second pistons reciprocable in said cylinders, wherein said second piston has a drive stem and divides said second cylinder into a first volume containing said drive stem of said second piston and a second volume between said two pistons;

air inlet means communicating with said first cylinder;

exhaust means communicating with said first cylinder;

means defining a common combustion space between said pistons when said pistons are substantially at their inner dead centre positions, said combustion space comprising said second volume;

transfer means for enabling gas flow between said first and second volumes;

inhibiting means for inhibiting movement of a substantial amount of fuel/air mixture from said first volume into said second volume until towards the end of the compression stroke of said second piston;

a first fuel source for providing fuel to said first volume;

drive means for driving said second piston;

and means for inducing swirl in gas flowing from the first cylinder into the second cylinder;

wherein said means for inducing swirl comprises a restriction between said cylinders having an aperture for directing a jet of said gas flow in a preset direction;

characterised in that said aperture extends in a direction towards the centre of the said crown when said second piston is at the top of its stroke, thereby to induce a toroidal gas flow, the core of which is formed by said jet of said gas flow.

Advantageously, said second piston has at least one vane on its crown to direct gas impinging on said crown in a direction about the axis of said second cylinder and thereby to cause rotation of said toroidal gas flow.

Preferably the restriction is a partition between the first and second cylinders, the partition having an aperture for directing the jet of gas flow in a preset direction.

In a preferred form of the invention the aperture directs the jet of gas flow in a direction to impinge on the crown of the second piston. The aperture conveniently extends in a direction substantially parallel to the axis of the second cylinder. In a preferred form the direction may be aligned with the axis of the second cylinder.

Preferably the drive means includes means for maintaining said second piston substantially stationary at or adjacent its inner dead centre position during at least a portion of the expansion stroke of said first piston.

DESCRIPTION OF THE DRAWINGS

The present invention is further described hereinafter, by way of example, with reference to the accompanying drawing, in which.

The invention described herein is an improvement on the engine disclosed in GB-A-2279407 the contents of which are incorporated here by reference. The reader is directed to this earlier specification for a full description of the engine and its methods of operation.

The Merritt engine shown in the drawings has a larger cylinder 12 and a smaller cylinder 14 which is an extension of the larger cylinder. A smaller piston 18 is movable in the smaller cylinder 14 and has a crown 35 and a cylindrical drive stem 234. A larger piston 16 is movable in the larger cylinder 12, has a crown 36 and is sealed with the aid of piston rings in the conventional way. The two pistons are moved by separate mechanisms which may be geared or coupled together or are controlled to operate together by a suitable mechanism C. For example, the larger piston may be moved by a crankshaft and connecting rod arrangement and the smaller piston by a cam 500 attached to a camshaft 600. The stroke distance of the two pistons may be different. Preferably the larger piston has a longer stroke.

The smaller piston 18 divides the second cylinder 14 into a first volume 15*a* behind the crown 35 of the smaller piston, containing the drive stem 234, and a second volume 15*b* situated between the two pistons. It will be appreciated that these volumes vary with the movement of the piston 18.

Fuel is delivered into the smaller cylinder 14 by a fuel injector 34. A spark plug 52 may be provided for ignition. The fuel injector and spark plug can be controlled by an engine management system M.

A combustion space 20 is formed between the two pistons 16,18 and is partially separated from the larger cylinder 12 by a restriction or plate 216 which has an aperture 2161. The aperture allows the movement of gases between the combustion space 20 and the larger cylinder 12 and serves a number of functions. It promotes swirl motion in the air moving from the larger cylinder 12 to the combustion space 20 during the compression stroke of the larger piston 16. It also promotes an outflow of hot gases from the combustion space during the early stages of combustion, in a form of a high velocity jet. This jet can be directed towards valve cavities in cylinder 12 which contain unused or parasitic air which can be made to participate in the combustion process. The size of aperture 2161 can vary according to the designer's choice, depending on the fuel and the compression ratio used.

The aperture extends in a direction to direct the jet of air from the larger cylinder 12 in a direction such that the jet impinges on the concave crown 35 of the smaller piston 18. As a result of this, the air being forced into the smaller cylinder 14 during the compression stroke is deflected from the concave crown of the piston, outwardly towards the wall 14A of the smaller cylinder where it is directed downwardly and then inwardly by the surface of the plate 216. The surface of the plate 216 is conveniently curved concavely in order to assist this movement of the gases.

The rapid mixing of air and vaporised fuel assists complete and rapid combustion of all the fuel in the Merritt engine and the present invention provides for a most advantageous way to achieve it in an indirect Merritt engine arrangement.

Figure 1:
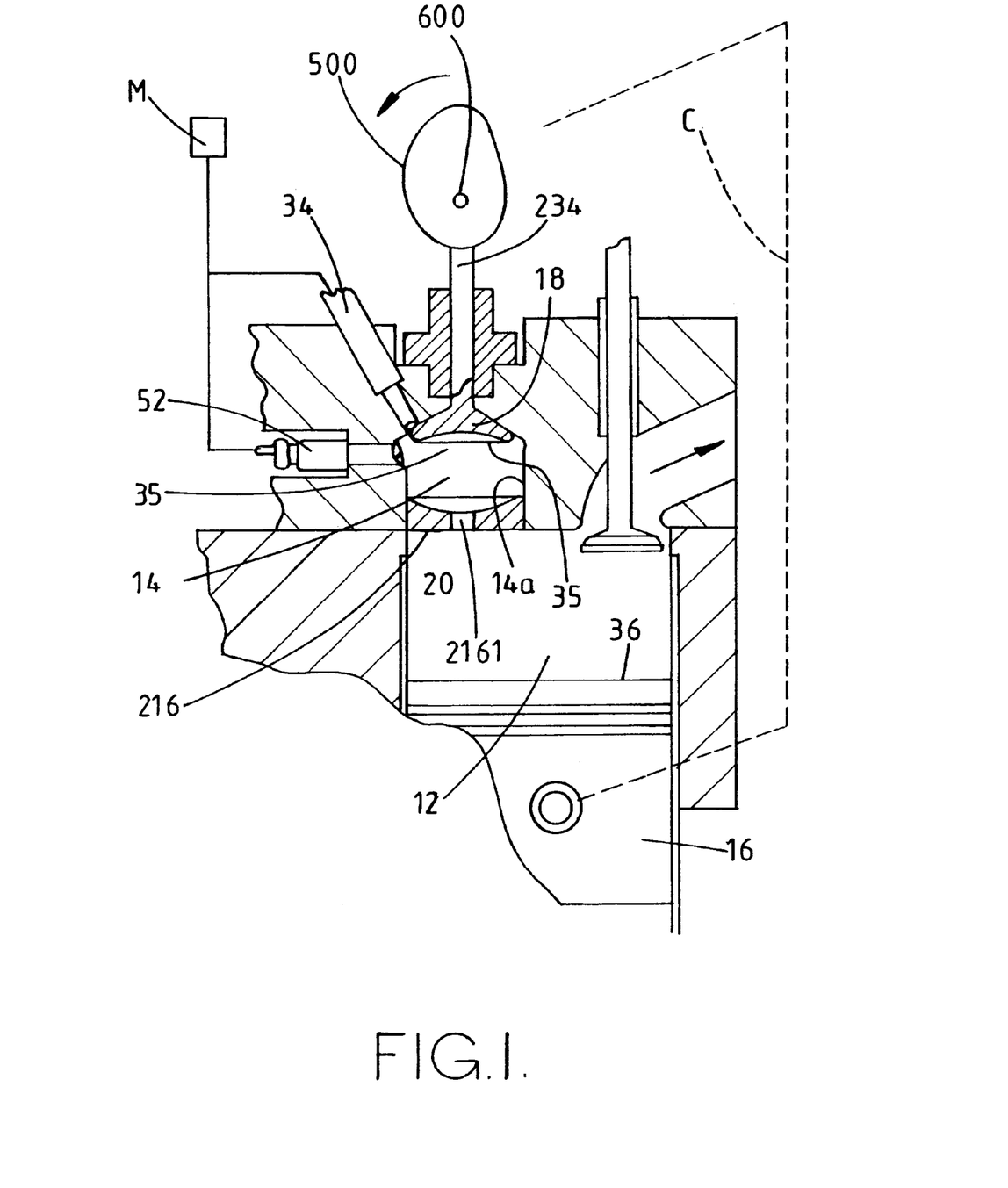
FIG. 1 is a partial section through a portion of a preferred form of engine according to the present invention.
Figure 2:
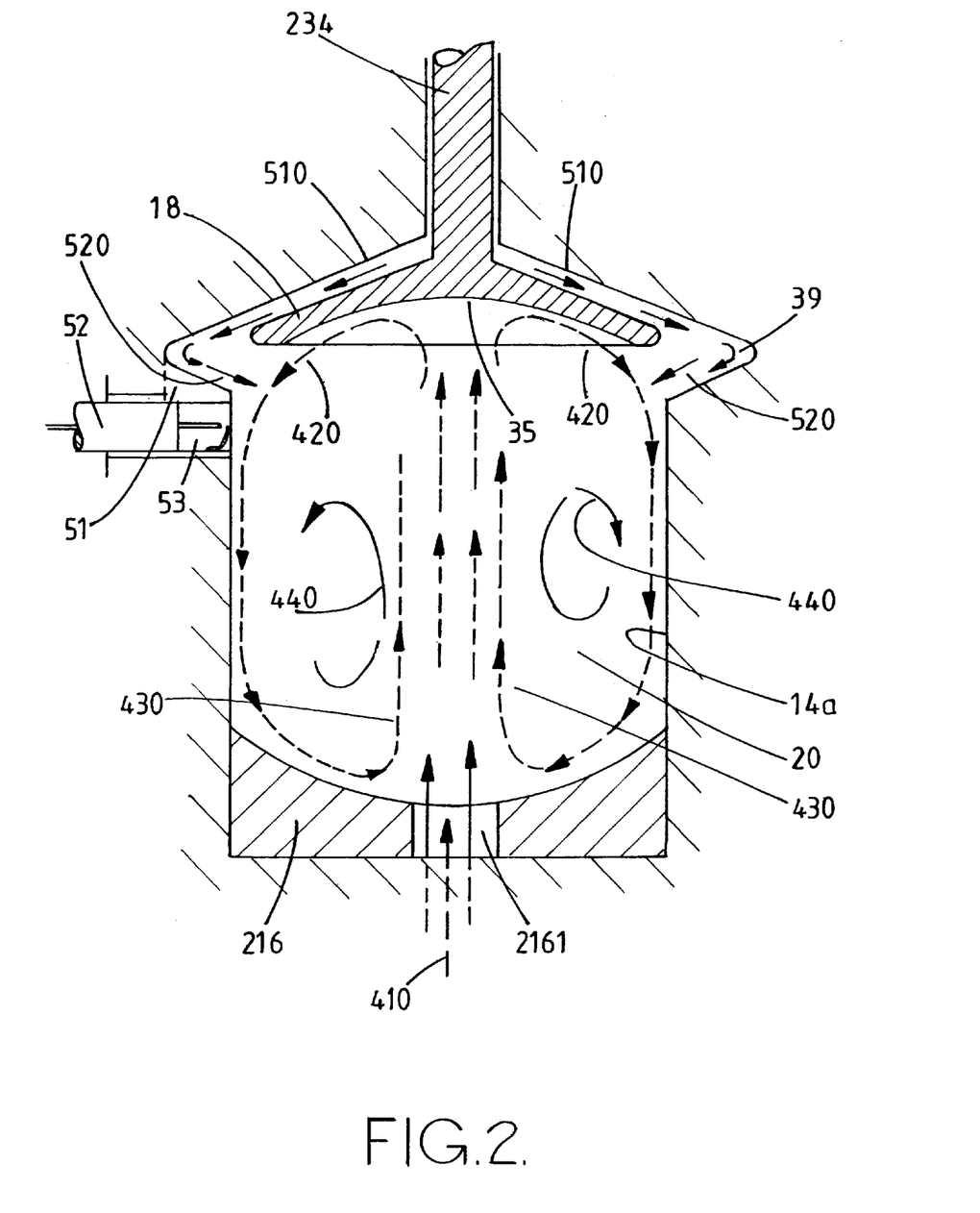
FIG. 2 is an enlarged view of a portion of FIG. 1.

The gas movements are illustrated in FIG. 2, which describes the situation in the combustion space 20 near the end of the compression stroke of the engine.

Figure 4:
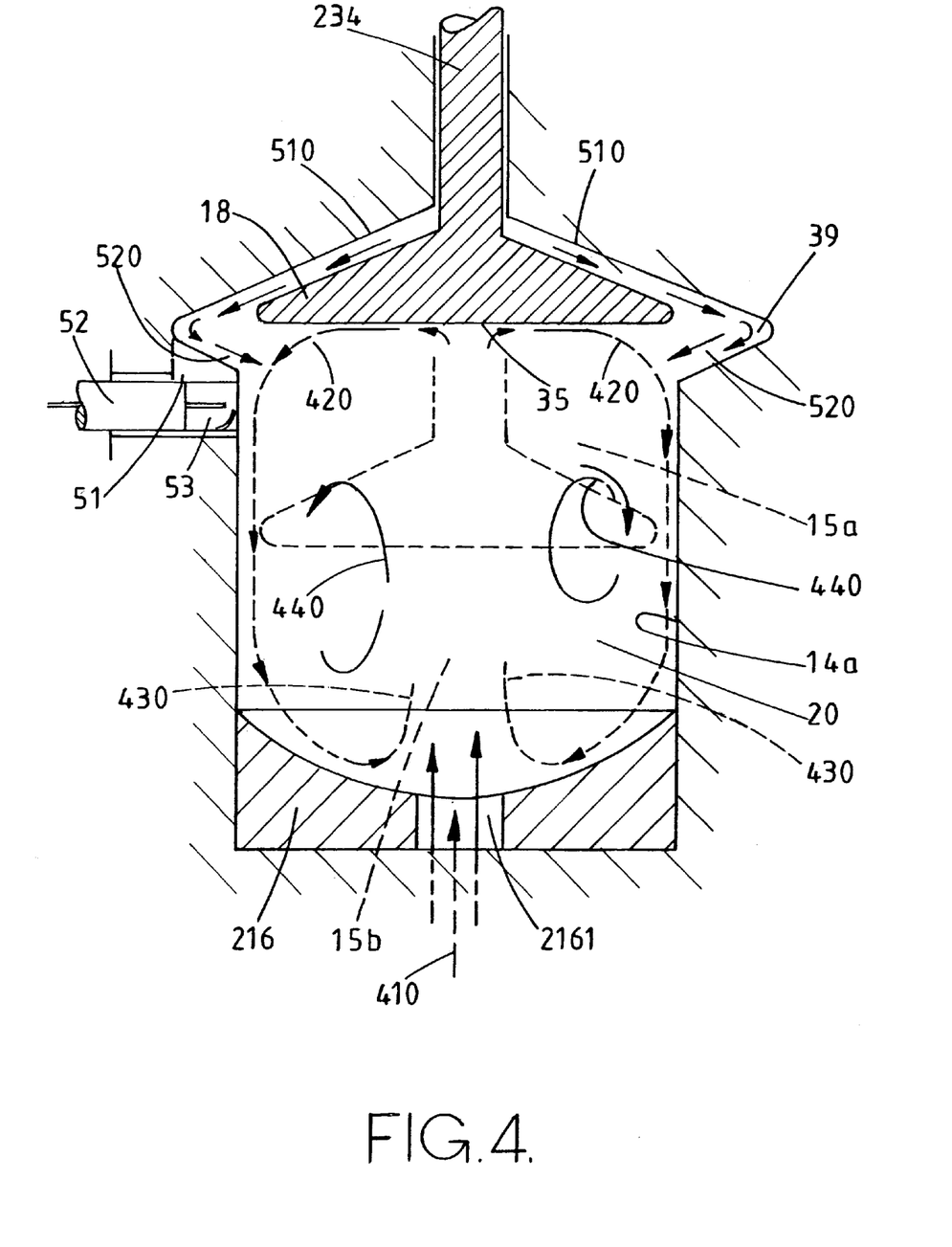
FIG. 4 is a variation of FIG. 2.
Figure 5:
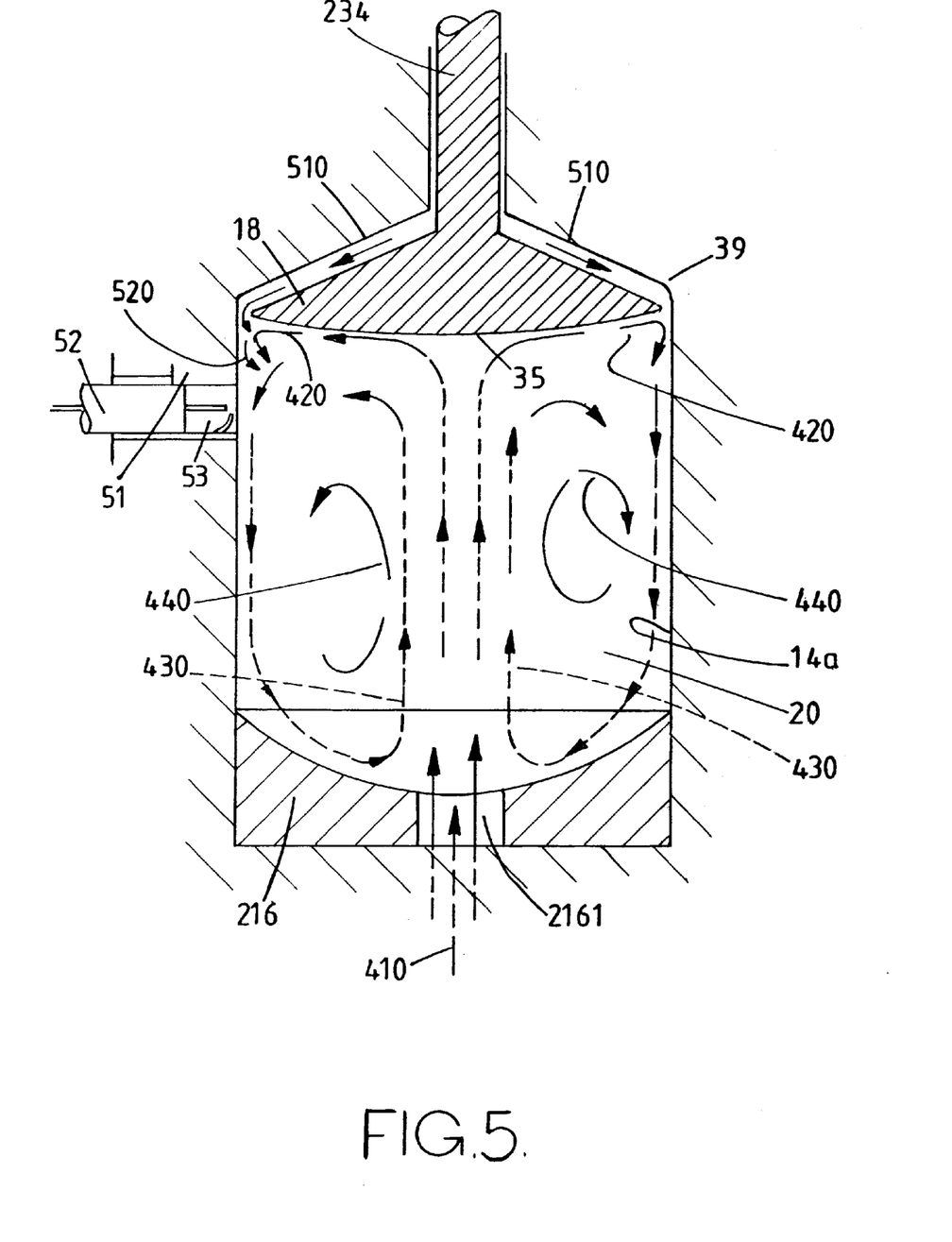
FIG. 5 is another variation of FIG. 2.

Air is delivered by the larger piston 16 (not shown) through orifice 2161 which is illustrated as a simple hole but can be of any shape. The jet of air rises and impinges on the lower surface of the crown of the smaller piston 35, near its centre where it is deflected to form a symmetrical downwards facing "fountain". Said lower surface is shown as concave in FIG. 2 but may be flat or convex as shown in FIGS. 4 and 5 respectively. The movement of the air within the combustion space starts at the beginning of the compression stroke of the larger piston and generates a toroidal air movement within the combustion space as the smaller piston 14 rises. This toroidal movement is illustrated by arrows 420,430 and 440 and can be seen to be continuously reinforced by the added momentum imparted by the air jet 410.

The toroidal movement can be seen to divert the air past the gap between the edge of the crown 35 and the wall 14A and also to purge the spark plug 52 in its cavity.

Near the end of the compression stroke the vaporised fuel and gas mixture shown by arrows 510 and 520 begins to emerge from the first volume 15*a* and is deflected into the path of the air by peripheral groove 39. The action is clearly shown in the arrow 520 representing fuel meeting with the arrow 420 representing air.

Such mixing action is extremely effective and rapid since it blends fuel and air uniformly around the periphery of the crown 35 of the piston 18.

Some of the fuel gas is allowed into the spark plug cavity 53 which connects the cavity 53 with the peripheral groove 39 through a slot 51 (FIG. 4) and this enables the spark plug to ignite some of the mixture and to initiate the process of spark triggered compression ignition for the remainder of the fuel.

The advantage of this particular "fountain" movement of the air is that when the smaller piston 18 arrives at or adjacent its inner dead centre position at the end of the compression stroke, the fuel/air mixture which passes from behind the smaller piston 18, around the edge of the crown and into the combustion chamber 20 is collected by the air passing across the gap between the piston edge and the cylinder wall to provide a thorough mixing of the ingressing fuel/air mixture with the circulating air.

Figure 3:
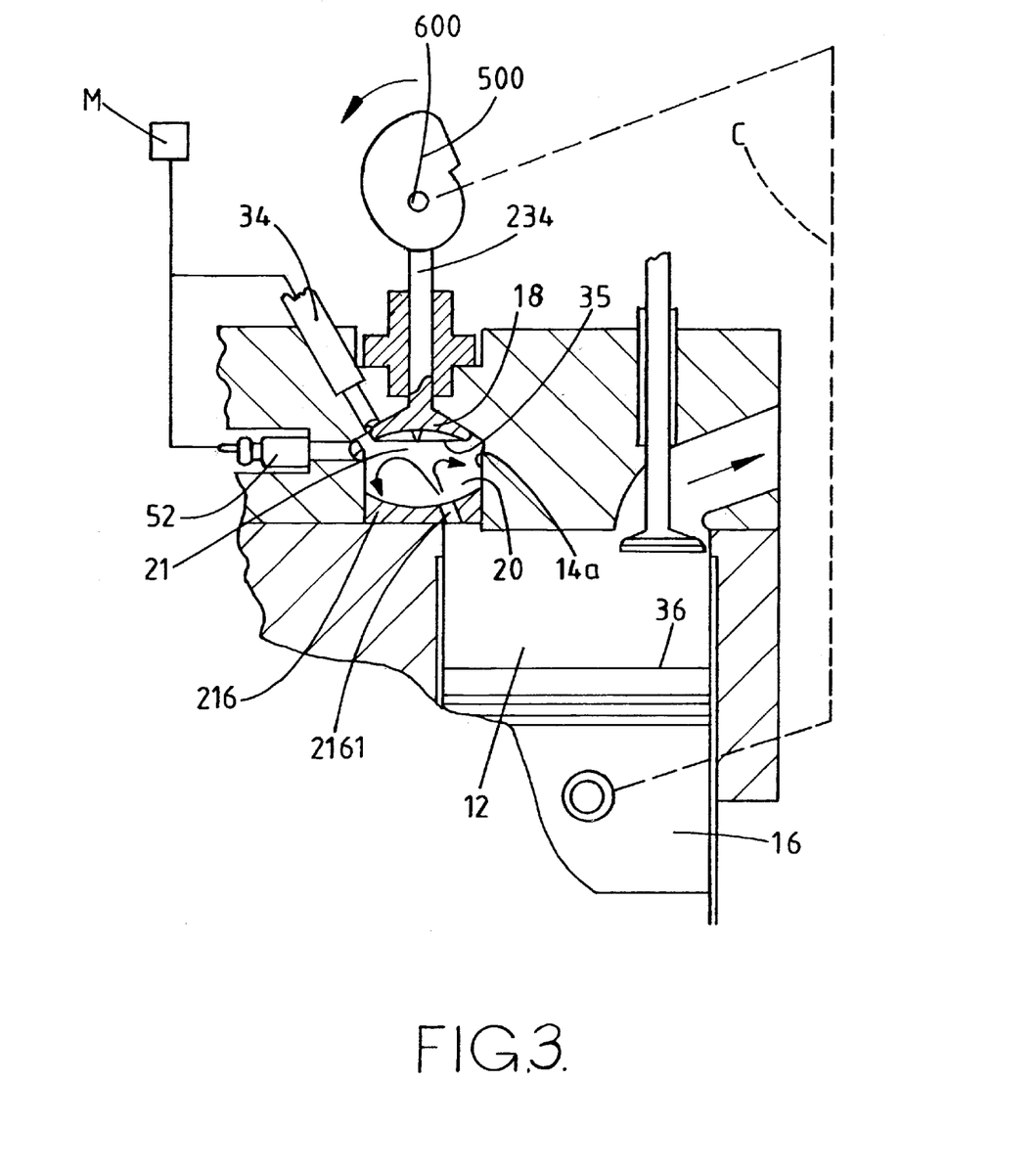
FIG. 3 is a view similar to that of FIG. 1 of a second embodiment of engine according to the present invention.

Ideally, the aperture 2161 is axially aligned with the centre of the crown of the smaller piston 18 but it can also be offset, as shown in FIG. 3, provided the air jet from the larger cylinder 12 is directed at the surface of the crown of the smaller piston 18 and not at the cylinder wall 14A or the gap between the piston crown and the cylinder wall.

As can be seen from FIG. 3, the surface of the crown 35 may have a central "pip" 21 or raised portion to assist in an even spread of air flow towards the edge of the crown.

The surface of the crown 35 at the peripheral region of the crown can also be angled relative to the axis of cylinder 14 to assist mixing of air with ingressing fuel and direct air towards the spark plug 52.

The surface of the crown 35 may be concave, as shown in FIG. 2 or flat as shown in FIG. 4 or convex as shown in FIG. 5 or a combination of two or all three configurations in a corrugated shape. In each of these cases a central conically shaped projection or pip 21 may be provided on the crown as shown in FIG. 3 to assist in the smooth deflection of air towards the periphery of the crown.

The shape of the surface of the crown is selected to provide the optimum air flow direction during the compression stroke particularly the air flow at the edge of the crown 35 so as to promote the mixing of fuel and air as completely as possible. For example the convex shape shown in FIG. 5 can effectively remove all fuel from the groove 39 but may have a slightly adverse affect on the toroidal motion of the air during the compression stroke.

Figure 6:
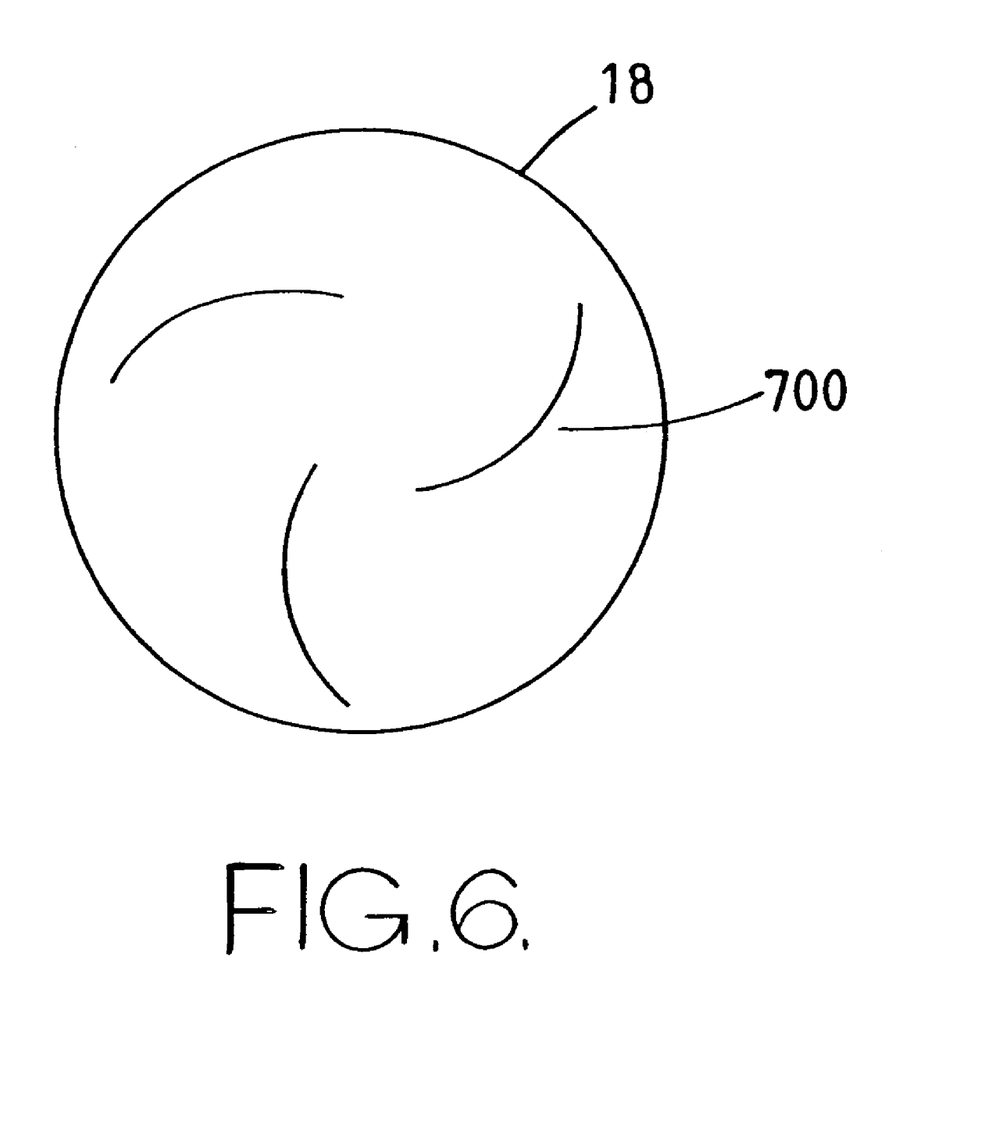
FIG. 6 is a plan view of a modified form of piston of the present invention.

FIG. 6 is a plan view of the crown 35 of a modified piston 18 which is provided with one or more vanes 700. These serve to direct the gas flow which impinges on the crown 35 in a circumferential direction about the axis of the smaller cylinder. Thus the swirl motion in the air which is injected into the combustion space 20 after it impinges on the crown of the piston 18 has both a toroidal motion and a circular or spiral component of movement about the axis of the second cylinder. This assists mixing of the fuel and air. In effect, these vanes give rise to a rotation of the toroidal swirl about the axis of the second cylinder.

Finally, as can be seen from FIG. 5, the groove 39 is not essential to operation of the invention and may be omitted.

The geometry and dimensions of the second cylinder are conveniently chosen such that the toroid described by the movement of the gas has a cross-section which is as near circular as possible.

The position of the sparkplug 52 is out of the mainstream of the high velocity gas movement and therefore offers it some protection. In addition, the spark can be generated across the gap between the sparkplug 52 and the edge of the piston 18 as the piston passes the sparkplug. As can be seen, when the piston 18 is at its inner dead centre position the sparkplug 52 is partially covered by the piston edge.

I claim:

1. An internal combustion engine comprising:
   at least one pair of first and second cylinders said first cylinder having a larger swept volume than said second cylinder;
   respective first and second piston reciprocable in said cylinders, wherein said second piston has a drive stem and divides said second cylinder into a first volume containing said drive stem of said second piston and a second volume between said two pistons;
   air inlet means communicating with said first cylinder;
   exhaust means communicating with said first cylinder;
   means defining a common combustion space between said pistons when said pistons are substantially at their inner dead center positions, said combustion space comprising said second volume;
   transfer means for enabling gas flow between said first and second volumes;
   inhibiting means for inhibiting movement of a substantial amount of fuel/air mixture from said first volume into said second volume until towards the end of the compression stroke of said second piston;
   a first fuel source for providing fuel to said first volume;
   drive means for driving said second piston;
   and means for inducing swirl in gas flowing from the first cylinder into the second cylinder;
   wherein:
      said means for inducing swirl comprises a restriction between said cylinders having an aperture for directing a jet of said gas flow in a preset direction;
      said second piston has a crown and said aperture extends in a direction towards the center of said crown when said second piston is at the top of its stroke, thereby to induce a toroidal gas flow in the flow of gas in said combustion space, the core of which is formed by said jet of said gas flow.

2. An internal combustion engine as claimed in claim 1 wherein said second piston has at least one vane on its crown to direct gas impinging on said crown in a direction about the axis of said second cylinder and thereby to cause rotation of said toroidal gas flow.

3. An internal combustion engine as claimed in claim 1 wherein said restriction is a partition between the first and second cylinders, the partition having said aperture for directing the jet of gas flow in pre-set direction.

4. An internal combustion engine as claimed in claim 3 wherein:
   said aperture directs the jet of gas flow in a direction to impinge on a crown of said second piston;
   and said aperture extends in a direction inclined to the axis of said second cylinder.

5. An internal combustion engine as claimed in claim 4 wherein said drive means has means for maintaining said second piston substantially stationary at or adjacent its inner dead center position during at least a portion of an expansion stroke of said first piston.

6. An internal combustion engine as claimed in claim 3 wherein:
   said aperture directs the jet of gas flow in a direction in impinge on a crown of said second piston;
   and said aperture extends in a direction inclined to the axis of said second cylinder.

7. An internal combustion engine as claimed in claim 6 wherein said drive means has means for maintaining said second piston substantially stationary at or adjacent its inner dead center position during at least a portion of an expansion stroke of said first piston.

8. An internal combustion engine as claim in claim 1 wherein said aperture directs the jet of gas flow in a direction to impinge on a crown of said second piston.

9. An internal combustion engine as claimed in claim 1 wherein said aperture extends in a direction substantially parallel to the axis of said second cylinder.

10. An internal combustion engine as claimed in claim 9 wherein said direction is aligned with the axis of said second cylinder.

11. An internal combustion engine as claimed in claim 1 wherein said aperture extends in a direction inclined to the axis of said second cylinder.

12. An internal combustion engine as claimed in claim 1 wherein said drive means has means for maintaining said second piston substantially stationary at or adjacent its inner dead center position during at least a portion of an expansion stroke of said first piston.

13. An internal combustion engine as claimed in claim 1 wherein:
   said aperture directs the jet of gas flow in a direction to impinge on a crown of said second piston;
   and said aperture extends in a direction inclined to the axis of said second cylinder.

14. An internal combustion engine as claimed in claim 13 wherein said drive means has means for maintaining said second piston substantially stationary at or adjacent its inner dead center position during at least a portion of an expansion stroke of said first piston.

15. An internal combustion engine as claimed in claim 1 wherein:
   for maintaining said second piston substantially stationary at or adjacent its inner dead center position during at least a portion of an expansion stroke of
   said aperture directs the jet of gas flow in a direction to impinge on a crown of said second piston;
   and said aperture extends in a direction inclined to the axis of said second cylinder.

16. An internal combustion engine as claimed in claim 15 wherein said drive means has means for maintaining said second piston substantially stationary at or adjacent its inner dead center position during at least a portion of an expansion stroke of said first piston.

* * * * *

UNITED STATES PATENT AND TRADEMARK OFFICE
CERTIFICATE OF CORRECTION

PATENT NO. : 6,003,487
DATED : December 21, 1999
INVENTOR(S) : Dan Merritt

It is certified that error appears in the above-identified patent and that said Letters Patent is hereby corrected as shown below:

Claim 15,
Line 49, delete the following paragraph:
[for maintaining said second piston substantially stationary at or adjacent its inner dead center position during at least a portion of an expansion stroke of]

Signed and Sealed this

Twenty-eighth Day of August, 2001

*Attest:*

NICHOLAS P. GODICI
*Attesting Officer*     *Acting Director of the United States Patent and Trademark Office*